United States Patent [19]

Holmgren

[11] Patent Number: 4,587,726

[45] Date of Patent: May 13, 1986

[54] METHOD AND APPARATUS FOR THE MANUFACTURE OF WELDING ELECTRODES

[76] Inventor: Werner A. Holmgren, Blodboksgatan 8, S 421 74 Västra Frölunda, Sweden

[21] Appl. No.: 644,774

[22] Filed: Aug. 27, 1984

[30] Foreign Application Priority Data

Aug. 29, 1983 [SE] Sweden ............................... 8304658

[51] Int. Cl.⁴ ........................................... H01R 43/00
[52] U.S. Cl. .................................. 29/825; 174/102 P; 219/145.22
[58] Field of Search ...................... 219/145.22; 29/825; 174/102 P

[56] References Cited

U.S. PATENT DOCUMENTS

| | | |
|---|---|---|
| 1,588,761 | 6/1926 | Ligot . |
| 2,442,087 | 5/1948 | Kennedy . |
| 3,513,287 | 5/1970 | Arnoldy ...................... 219/145.22 X |
| 4,203,188 | 5/1980 | Blanpain et al. ........... 219/145.22 X |
| 4,269,639 | 5/1981 | Lewis ........................... 174/102 P X |
| 4,313,247 | 2/1982 | Stuttard ............................ 29/825 X |

FOREIGN PATENT DOCUMENTS

| | | |
|---|---|---|
| 0003370 | 8/1979 | European Pat. Off. . |
| 58-44993 | 3/1983 | Japan . |
| 58-112694 | 7/1983 | Japan . |
| 1177993 | 1/1970 | United Kingdom . |
| 1485571 | 9/1977 | United Kingdom . |
| 2059304 | 4/1981 | United Kingdom .................. 29/825 |
| 2106428 | 4/1983 | United Kingdom .................. 29/825 |

Primary Examiner—Howard N. Goldberg
Assistant Examiner—Carl J. Arbes
Attorney, Agent, or Firm—Nils H. Ljungman

[57] ABSTRACT

In the method of manufacturing a continuous powder-filled tubular welding electrode, a strip of metal is initially shaped into an open channel and subsequently into a tube by abutting the edges of the strip. The edges are then welded to one another. The powder falls from a hopper into the tube which is fed downwards at the weld spot. The falling powder falls past the weld spot. The speed of the falling powder at the weld spot is higher than the speed of the tube, e.g., the speed of the falling powder is twice the speed of the tube. The powder which is subjected to the welding heat for a very short period of time fills the welded tube below the weld stop in step with the speed of the tube. Subsequently, a suitable reduction of the cross-sectional area of the powder-filled tube takes place.

18 Claims, 10 Drawing Figures

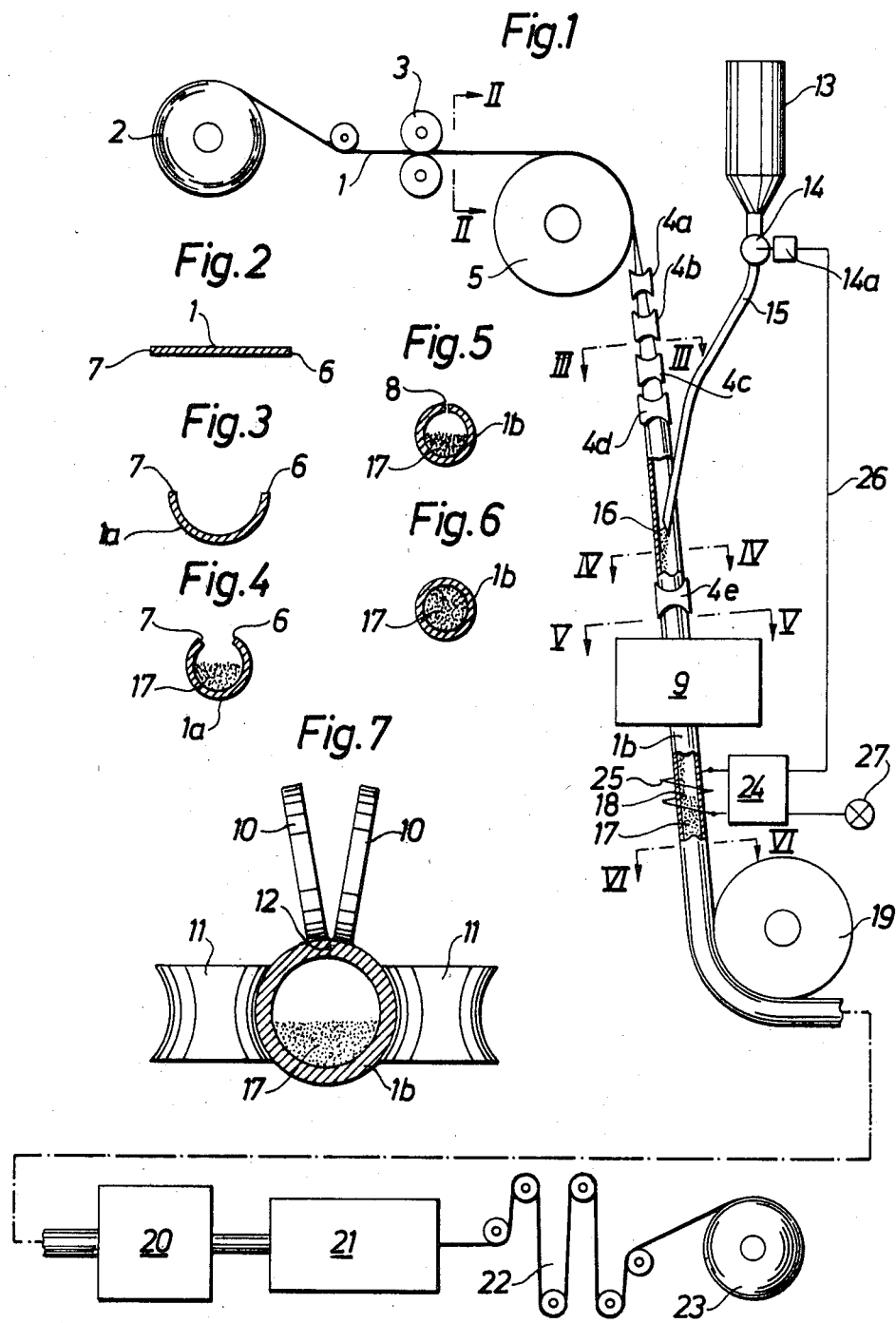

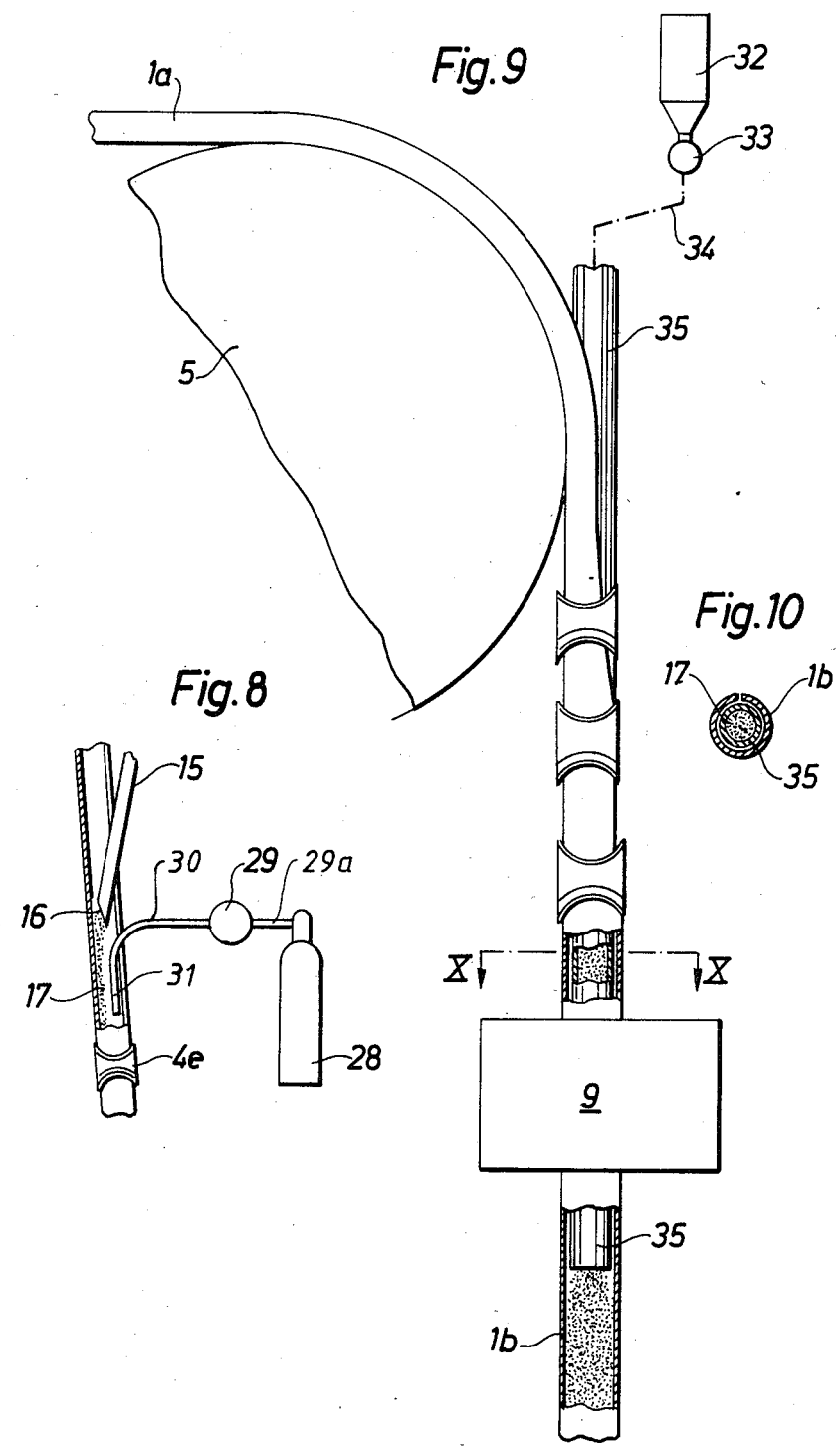

METHOD AND APPARATUS FOR THE MANUFACTURE OF WELDING ELECTRODES

BACKGROUND OF THE INVENTION

Field of the Invention

The present invention relates to a method for the continuous manufacture of powder-filled tubular welding electrodes and to an apparatus for their production. Such electrodes can, for example, be used for automatic or semiautomatic arc welding of metal pieces with or without shielding gas or under flux.

In the prior art, such a method previously included steps of continuously feeding a metal strip means at a predetermined speed, forming the strip means into an open channel with edges extending longitudinally from the channel and forming a tube by abutting the edges, then discharging welding powder into the tube from a filling station, and then passing said tube through a welding station at which the abutting edges are continuously welded to each other at the predetermined speed by heating the abutting edges at a welding spot or location. The welding powder is passed into the tube through the welding station at some distance from the welding spot or location and thereafter the cross-sectional area of the welded and powder-filled tube is reduced to a desired dimension. Prior to forming, the metal strip means may, for example, have the shape of extruded wire or metal strip. During manufacture, the metal strip means is also represented by the open channel and the tube.

The advantages featured by this type of tubular electrode with a welded tube, i.e. seamless cover, are numerous compared to a tubular covering comprising a strip, which has as yet only been closed by menas of bending and folding, thus resulting in an open joint. The seamless electrode features absolute protection against deleterious hygroscopic absorption. As a result, it may be subjected to cleaning in cleaning baths and to copperplating in, e.g., galvanic baths during manufacture.

Several proposals relative to the production of such electrodes have been known. According to the U.K. Patent Specification No. 1 177 993 - a prewelded tube is wound on to a coil having a vertical axis which is filled with welding powder through one of its feed ends. Then by simultaneously shaking the entire coil, the powder is thereby evenly distributed throughout the tube and fills the entire volume. This manufacturing process, which is not continuous, is quite complicated. It requires prefabrication and precoiling of the tube before it can be filled with welding powder.

According to another idea - U.K. Patent Specification No. 1 485 571 - a strip formed to make an open channel is filled with welding powder before the edges of the channel are welded together. Simultaneously keeping pace with the feed speed of the tube, a strip is inserted into the tube which acts as a backing strip during the welding of the edges of the tube. The backing strip protects the welding powder against overheating by the welding heat. According to still another idea - European Patent Application No. 003 370 - the open channel is filled with a limited amount of powder prior to being closed into a tube. Consequently, only part of the cross-sectional area of the tube will be filled with powder as the tube passes the welding station. The powder passes the weld at the same speed as the tube but at some distance from the weld spot or location, thereby preventing to some degree the deleterious influence of the welding heat on the powder. However, relative to the aforementioned process, there is some risk of powder damage due to overexposure to welding heat. The accumulation of powder at the weld is difficult to control, especially as the magnetic field produced by the welding current greatly influences the somewhat ferromagnetic powder. The magnetic field also causes an uneven powder distribution inside the tube, thus impairing the welding properties of the electrode.

OBJECT OF THE INVENTION

It is an object of this invention to improve the method for the manufacture of tubular electrodes of this kind by reducing the thermal exposure of the welding powder during the welding of the electrode.

SUMMARY OF THE INVENTION

The invention provides a method of feeding the metal strip means to be formed into a tubular electrode downwards in the vicinity of the welding spot at an angle to the horizontal plane, which is greater than the limit sliding angle of the welding powder, thereby causing the welding powder to fall from such a height into the tube that the speed of the welding powder, when passing the welding spot, is greater than the predetermined speed of the metal strip means at the welding spot.

The limit sliding angle of the welding powder is approximately 45°. Due to various factors such as powder composition and grain size, this specific angle, indicating the internal friction between the powder particles, may exceed or fall below this standard value. The powder particles only slide downwards when the said angle to the horizontal plane is greater than the limit sliding angle of the powder. The powder should preferably pass the welding spot at a speed which is at least 1.5 times the metal strip feed speed. In order to attain easily such a speed, the angle to the horizontal plane should preferably be between 80° and 90°. The faster the powder will flow at the welding spot the more the cross-sectional area of the powder flow may be reduced at a given amount of powder per unit time and the time required by the powder to flow past the hot welding spot will also be greatly reduced.

The present invention also provides a method wherein the speed of the powder after the passage of the welding spot is reduced to the speed of the metal strip means before reducing the cross-sectional area of said welded tube by bending the metal strip means into a feeding direction at an angle to the horizontal plane which is smaller than the limit sliding angle of the powder. When the inclination angle of the welded tube is smaller than the limit sliding angle, the powder is prevented from further sliding along the tube wall and will be accumulated in the tube and transported in the tube at the speed of the tube. Preferably, the powder is discharged into the tube at such an amount per time unit that the powder accumulated below the welding spot occupies the entire internal cross-sectional area of the tube.

The present invention also provides an apparatus for the implementation of the method described above including first storing means for a metal strip means, means for feeding the metal strip means with a predetermined speed from the first storing means, means for continuously forming the metal strip means to an open channel with longitudinally extending edges and subsequently into a tube by abutting the longitudinal edges, a welding station for continuously welding said abutting edges to each other by heating said edges to welding temperature at the welding spot thereby producing a welded tube, second storing means for storing said welding powder and being provided with a conduit for leading said welding powder to a nozzle means disposed for introduction of said welding powder, in operation into said tube, means for proportioning a desired amount of said welding powder per time unit, means for reducing the size of the cross-sectional area of said welded tube to a desired dimension; the improvment comprising: first guiding means being disposed to guide said strip means in the vicinity of said welding station at an angle to the horizontal plane which is greater than the limit sliding angle of said welding powder, a falling path for said welding powder partly constituted by said metal strip means formed into said open channel above said welding spot on said metal strip means substantially stationary with respect to said apparatus and said strip means being formed into said welded tube below said welding spot, said falling path, in operation, extending between an upper level above said nozzle means and a lower level below said welding spot, the distance between said upper level and said welding spot being so great that said falling welding powder is accelerated at said welding spot to a falling speed which is greater than the speed of said strip means.

This invention possesses many other advantages and has other objects which will be made clearer from a consideration of one embodiment of the invention.

BRIEF DESCRIPTION OF THE DRAWINGS

There are provided drawings accompanying and forming part of the present specification. The embodiment will now be described in detail illustrating the general principles of the invention, but it is to be understood that this detailed description is not to be taken in a limiting sense since the scope of this invention is best defined by the appended claims.

FIG. 1 is a schematic representation of an apparatus for manufacture of a powder-filled welding electrode.

FIG. 2 to FIG. 6 show sectional views through the metal strip at different points of the apparatus.

FIG. 7 shows a schematic representation of a welding station.

FIG. 8 shows a modified design of the apparatus according to FIG. 1.

FIG. 9 shows another modified design of the apparatus.

FIG. 10 shows a section taken as indicated by line X—X in FIG. 9.

It is pointed out that the dimensions of the metal strip are intentionally greatly exaggerated to make the invention easier to illustrate.

DETAILED DESCRIPTION OF THE PREFERRED EMBODIMENT

A metal strip 1, which is to be formed into a seamless sheath of a powder-filled electrode, is played out from a reel 2 and fed continuously through a calibrating device 3. The strip 1 is generally obtained by slitting a wide strip into several narrow longitudinal sections. Normally, this technique does not produce absolutely uniform cross-sectional areas along the whole length of the strip 1. The flat surfaces frequently have a slightly convex shape. However, the ratio between the weight of the sheath of the electrode and the powder must remain constant along the entire strip 1. A uniform longitudinal cross-sectional area along the entire strip 1 is obtained by means of the calibration device 3.

Subsequently, the horizontal fed strip is conveyed to an upper bending roll 5. The strip 1 leaves the upper bending roll 5 at an angle slightly less than 90°, preferably at an angle between 80° and 90°, to the horizontal plane. Then the strip is formed into an open channel 1a by shaping rolls 4a, 4b. Additional shaping rolls 4c, 4d, 4e then form the metal strip 1 into a tube 1b. The number of shaping rolls, here only illustrated schematically, may vary. The contour transition of the cross-sectional area is illustrated by FIG. 3 to FIG. 5 showing cross-sections on an enlarged scale. Considerable variations in appearance relative to these transitional forms do occur due to the type of technique applied. The technique, however, is well-known and therefore not desribed in detail in this specification.

Once the metal strip 1 is in the shape of a tube (FIG. 5), the longitudinal abutting edges 6, 7 of the strip 1 form a joint 8. The illustration of this tube shows a circular cross-section. Other cross-sectional shapes may be chosen. Continuous longitudinal welding of the tube 1b along the joint 6 is carried out at a welding station 9, here only indicated. The cross-section of the tube 1b after welding is shown in FIG. 6. Different modes of welding with or without filler material are applicable when welding this joint 8. To limit the welding heat at the welding spot or location and its vicinity, a high welding speed in the order of 0.5 m/sec and more and a low welding power are advantageous.

FIG. 7 shows a schematic view of a feasible equipment for resistance seam welding of the tube 1b using two electrode wheels 10 and support wheels 11 by means of which the edges 6, 7 of the tube 1b will be pressed against each other and closed by the weld 12. Continuous welding here also includes welding techniques involving pulsed welding power which is obtainable by supplying A.C. at a specific frequency.

The welding powder is discharges from a hopper 13 fitted with a powder dispenser 14 and a control device 14a for proportioning the amount of powder per time unit discharged from the dispenser 14. The powder is fed through a conduit 15 into the open channel 1a which, as yet, is not completely closed (FIG. 4). The powder falling through the conduit 15 is directed toward the bottom of the open channel 1a, by a powder nozzle 15 at the front end of the conduit 15. The channel 1a and the tube 1b guide the falling powder which slides down them past the welding station 9 in the welded tube. The height of fall between the hopper 13 and the weld spot 12 in the welding station should be sufficiently great to cause the speed of the falling powder at the welding spot 12 be to at least 1.5 times, and preferably, at least twice as fast as the feed speed of the tube 1b. When passing the weld (FIG. 7), the falling powder occupies only part of the cross-sectional area of the tube 1b, here approximately one-half of this area. Due to the downward angle of the tube 1b, the falling powder 17 passes the welding spot 12 at some distance. The powder 17 is accelerated until it is checked in the tube 1b below the welding station 9 at a distance from the welding spot 12 where the welding heat does not deleteriously affect the powder. This occurs here at a level 18 at which the powder continuously accumulates by filling the entire cross-section of the welded tube.

The powder-filled tube is then conveyed to a lower bending roll 19 and leaves this roll horizontally. The arrangement of the two bending rolls 5 and 19 determines the inclination of the part of the metal strip advanced between these rolls 5 and 19. From the lower bending roll, the tube is conveyed to a rolling station 20 for an initial reduction of the cross-sectional area of the tube. Thereafter, the cross-sectional area is reduced to the desired dimension at a drawing station 21 which preferably also is fitted with a heat treatment device. In addition, the drawing station 21 might also be provided with some type of cleaning bath (not shown) for the removal of the drawing agent from the surface of the wire and a copper-plating bath. The finished wire passes through a device 22 for compensating length variations before it is wound on a reel 23.

The advancement of the metal strip is carried out by means of the shaping and bending rolls, as well as the rolling and drawing devices which are provided with driving motors (not shown). Their interconnection produces a wire feed speed adapted to the dimensions of the strip. The speed of the strip as it passes through the drawing station 21, therefore, far exceeds the feed speed at the welding spot.

An indicator 24 senses the degree of the powder-filling in the tube at the level 18 where the speed of the falling powder 17 is reduced to the speed of the tube 1b by the accumulation of the powder and complete filling of the internal tube area. The indicator 24 is provided with a coil 25 wound around the tube, which measures the common magnetic permeability of the tube and the powder-filling. Should the powder accumulation not occur at the predetermined level 18, the indicator 24 will transmit an error signal via an indicator lead 26 to the control device 14a of the powder dispenser 14 thereby adjusting the dosage rate of the discharged powder and simultaneously lighting up a warning lamp 27.

In case of exceptionally high-quality demands relating to the electrode, a shielding gas equipment (FIG. 8) is added to the apparatus. This equipment comprises a tube 28 for containing shielding gas. This tube is connected to a gas valve 29 by a conduit 29a and a gas nozzle 31 is connected to the gas valve 29 by a gas conduit 30. The nozzle 31 extends into the interior of the not yet welded tube 1b. Suitable gas-flow regulation is accomplished by subjecting the tube section 16 between the gas nozzle 31 and the level 18, as shown in FIG. 1, to some excess pressure, thus ensuring that this section be essentially filled with shielding gas, for example, $CO_2$.

In one of the modified designs, the metal strip 1 is advanced downwards vertically from the upper bending roll 5. The powder is added from a hopper 32 via a powder dispenser 33 and then through a powder conduit 34, here only indicated, and via a powder-filling 35 into the welded tube below the welding station 9. The speed of the powder 17 falling through the filling tube 35 exceeds considerably the speed of the metal strip at the welding spot. The powder is aso quided past the welding spot 12 and there protected against the heat generated at the welding spot by the wall of the filling tube 35. In other respects, this apparatus is provided with the same type of equipment as described in connection with FIG. 1.

It is within the scope of the invention to eliminate the upper bending roll and to mount the metal strip reel, the calibrating device, if any, as well as the shaping rolls in a downward direction along a straight production line.

The invention is not to be taken as limited to all the details that are described herein above, since modifications and variations thereof may be made without departing from the spirit or scope of the invention.

What is claimed is:

1. A method for the continuous manufacture of powder-filled tubular electrodes including the steps of:
   continuously feeding a metal strip at a predetermined speed;
   forming said metal strip into an open channel with edges extending longitudinally of the channel;
   forming a tube by abutting said edges;
   discharging a welding powder into the tube from a filling station;
   passing said tube through a welding station at which location the abutting edges are continuously welded to each other as the metal strip passes at said predetermined speed by heating said edges at a welding location;
   inserting said welding powder into the tube at some distance from said welding location;
   reducing the cross-sectional area of said welded and powder-filled tube to a desired dimension;
   the improvement comprising:
   feeding said metal strip downwards in the vicinity of said welding location at an angle to the horizontal plane which is greater than the limit sliding angle of said welding powder within said metal strip;
   causing said powder to fall into said tube such that said speed of said powder when passing said welding location on said metal strip is greater than said predetermined speed of said metal strip at said welding location; and
   introducing a shielding gas into said welded tube in an amount so that interspaces between said powder particles are substantially filled with said shielding gas.

2. A method as set forth in claim 1, wherein the speed of said welding powder when passing said welding location is at least 1.5 times the speed of said metal strip.

3. A method as set forth in claim 1, wherein the speed of said welding powder subsequent to its passage of said welding location is reduced to the speed of said metal strip before reducing the cross-sectional area of said welded tube by bending said metal strip into a feeding direction at an angle to the horizontal plane which is less than said limit sliding angle.

4. A method as set forth in claim 2, wherein the speed of said welding powder subsequent to its passage of said welding location is reduced to the speed of said metal strip before reducing the cross-sectional area of said welded tube by bending said metal strip into a feeding direction at an angle to the horizontal plane which is less than said limit sliding angle.

5. A method as set forth in claim 3, wherein the powder is discharged into said tube at such an amount per time unit that said welding powder accumulates below said welding location and occupies the entire internal cross-sectional area of said tube.

6. A method as set forth in claim 4, wherein the powder is discharged into said tube at such an amount per time unit that said welding powder accumulates below said welding location and occupies the entire internal cross-sectional area of said tube.

7. An apparatus for continuous manufacture of a powder-filled tubular electrode including:
   first storing means for storing a metal strip;

means for feeding said metal strip at a pre-determined speed from said first storing means, said feeding means being operatively associated with said first storing means;

means for continuously forming said metal strip into an open channel with longitudinally extending edges and subsequently into a tube by abutting said longitudinal edges, said means for continuously forming said metal strip being operatively associated with said means for feeding said metal strip;

a welding station for continuously welding said abutting edges to each other by heating said edges to welding temperature at the welding location thereby producing a welded tube, said welding station being operatively associated with said means for continuously forming said metal strip;

second storing means for storing welding powder and being provided with a conduit for leading said welding powder to a nozzle means disposed for introduction of said welding powder, in operation, into said tube, said second storing means for storing said welding powder being operatively associated with said welding station;

means for proportioning a desired amount of said welding powder per time unit, said means for proportioning being operatively associated with said second storing means;

means for reducing the size of a cross-sectional area of said welded tube to a desired dimension, said means for reducing the size of said welded tube being operatively associated with said welding station;

the improvement comprising:

first guiding means being disposed to guide said metal strip in the vicinity of said welding station at an angle to the horizontal plane which is greater than the limit sliding angle of said welding powder, a falling path for said welding powder partly constituted by said metal strip formed into said open channel above said welding location on said metal strip substantially stationary with respect to said apparatus and said metal strip being formed into said welded tube below said welding location, said first guiding means being operatively associated with said welding station; and said falling path, in operation, extending between an upper level above said nozzle means and a lower level below said welding location, the distance between said upper level and said welding location being so great that said falling welding powder is accelerated at said welding location to a falling speed which is greater than the speed of said metal strip; and means for introducing a shielding gas into said welded tube, said means for introducing being operatively associated with said welding station, whereby interspaces between particles of said welding powder in said welded tube, during operation of said apparatus, are substantially filled with said shielding gas.

8. An apparatus as set forth in claim 7, including second guiding means for guiding said welding powder to a position at some distance past the welding location, said second guiding means being operatively associated with said welding station.

9. An apparatus as set forth in claim 7, wherein said lower level is at a distance from said welding location where the welding heat does not deleteriously affect said welding powder which is continuously accumulated at said lower level and said welding powder occupying the entire cross-sectional area of the tube by suitably adjusting said proportioning means.

10. An apparatus as set forth in claim 7, wherein said lower level is at a distance from said welding location where the welding heat does not deleteriously affect said welding powder which is continuously accumulated at said lower level and said welding powder occupying the entire cross-sectional area of the tube by suitably adjusting said proportioning means.

11. An apparatus as set forth in claim 9, wherein said metal strip is guided in the vicinity of the welding station by an upper and a lower bending roll, said upper and said lower bending roll being operatively associated with said welding station.

12. An apparatus as set forth in claim 10, wherein said metal strip is guided in vicinity of the welding station by an upper and a lower bending roll, said upper and said lower bending roll being operatively associated with said welding station.

13. An apparatus as set forth in claim 8, wherein said second guiding means is a stationary partition wall which is inserted into the tube and extends past the welding location dividing the tube channel into two parts one of them separated from the welding location and serving as guiding channel for said welding powder and wherein at least said second guiding means is disposed with respect to said welding location whereby said welding powder supplied by said second guiding means is moving at a speed, at least at said welding location, substantially greater than said predetermined speed of said metal strip moving past said welding location.

14. An apparatus as set forth in in claim 9, wherein said second guiding means is a stationary partition wall which is inserted into the tube and extends past the welding location dividing the tube channel into two parts one of them separated from the welding location and serving as guiding channel for said welding powder and wherein at least said second guiding means is disposed with respect to said welding location whereby said welding powder supplied by said second guiding means is moving at a speed, at least at said welding location, substantially greater than said predetermined speed of said metal strip moving past said welding location.

15. An apparatus as set forth in claim 14, wherein said partition wall constitutes said conduit for leading said welding powder which is inserted into said tube, and said nozzle being at a level between the welding location and said lower level.

16. An apparatus as set forth in claim 7, wherein said first guiding means are arranged to guide said metal strip in the vicinity of the welding station at an angle to the horizontal plane which is between 80° and 90°.

17. An apparatus as set forth in claim 7, wherein means are provided for indicating the filling rate of said welded tube at said lower level, said filling rate indicating means being operatively associated with said first guiding means.

18. An apparatus as set forth in claim 17, wherein said indicating means are arranged to generate an error signal if the filling rate at said lower level deviates from a desired value, and means for transmitting said error signal being operatively connected for transmitting to said proportioning means to adjust the amount of said welding powder per time unit whereby said welding powder supplied is moving at a speed, at least at said welding location, substantially greater than said predetermined speed of said metal strip moving past said welding location.

* * * * *